US009546785B1

(12) United States Patent
Baker et al.

(10) Patent No.: US 9,546,785 B1
(45) Date of Patent: Jan. 17, 2017

(54) SWEEP-BASED MEMBRANE SEPARATION PROCESS FOR REMOVING CARBON DIOXIDE FROM EXHAUST GASES GENERATED BY MULTIPLE COMBUSTION SOURCES

(71) Applicant: Membrane Technology and Research, Inc., Newark, CA (US)

(72) Inventors: Richard W Baker, Palo Alto, CA (US); Timothy C. Merkel, San Jose, CA (US)

(73) Assignee: Membrane Technology and Research, Inc., Newark, CA (US)

( * ) Notice: Subject to any disclaimer, the term of this patent is extended or adjusted under 35 U.S.C. 154(b) by 0 days.

(21) Appl. No.: 15/180,922

(22) Filed: Jun. 13, 2016

(51) Int. Cl.

| | |
|---|---|
| ***B01D 53/22*** | (2006.01) |
| ***F23J 15/02*** | (2006.01) |
| ***F23L 7/00*** | (2006.01) |
| ***B01D 53/62*** | (2006.01) |
| *B01D 53/14* | (2006.01) |

(52) U.S. Cl.

CPC .............. *F23J 15/02* (2013.01); *B01D 53/226* (2013.01); *B01D 53/229* (2013.01); *B01D 53/62* (2013.01); *F23L 7/007* (2013.01); *B01D 53/1475* (2013.01); *B01D 2257/504* (2013.01); *B01D 2258/0283* (2013.01)

(58) Field of Classification Search

CPC ..... B01D 53/22; B01D 53/226; B01D 53/229; B01D 53/1475; B01D 53/62; B01D 2257/504; B01D 2258/00; B01D 2258/02; B01D 2258/0283; F23J 15/02

See application file for complete search history.

(56) References Cited

U.S. PATENT DOCUMENTS

| | | | |
|---|---|---|---|
| 990,168 | A | 4/1911 | Scott |
| 4,350,511 | A | 9/1982 | Holmes et al. |
| 4,371,381 | A | 2/1983 | Schuftan |
| 4,462,814 | A | 7/1984 | Holmes et al. |
| 4,639,257 | A | 1/1987 | Duckett |
| 4,659,343 | A | 4/1987 | Kelly |
| 4,923,493 | A | 5/1990 | Valencia et al. |
| 4,931,070 | A | 6/1990 | Prasad |
| 4,963,165 | A | 10/1990 | Blume |
| 4,990,168 | A | 2/1991 | Sauer et al. |

(Continued)

OTHER PUBLICATIONS

US 4,981,498, 01/1991, Bikson et al. (withdrawn)

Gas Purification, A. Kohl and R. Nielsen, Fifth Edition, Gulf Publishing CO., Houston, TX, 1997, pp. 1188-1237.

*Primary Examiner* — Jason M Greene

(74) *Attorney, Agent, or Firm* — Timothy A. Hott

(57) ABSTRACT

A gas separation process for treating exhaust gases from multiple combustion sources. The invention involves directing an exhaust gas stream from one combustion step to a carbon capture step. An off-gas stream depleted in carbon dioxide from the carbon capture step is mixed with a second exhaust stream from a second combustion step to form a mixed gas stream. The mixed gas stream is passed as a feed stream across the feed side of a membrane that is selectively permeable to carbon dioxide over nitrogen and carbon dioxide over oxygen. A sweep gas stream, usually air, flows across the permeate side, and picks up the preferentially permeating carbon dioxide. The permeate stream withdrawn from the permeate side of the membrane is then recycled back to the combustor.

28 Claims, 5 Drawing Sheets

211
209
208
210
219b
206
213
219a
219c
219d
207
212
215
214
216
204
205
201
218
203
202
217

(56) References Cited

U.S. PATENT DOCUMENTS 5,034,126 A 7/1991 Reddy et al.
5,233,837 A 8/1993 Callahan
5,240,471 A 8/1993 Barbe et al.
5,500,036 A 3/1996 Kalthod
5,641,337 A 6/1997 Arrowsmith et al.
5,681,433 A 10/1997 Friesen
5,843,209 A 12/1998 Ray
6,085,549 A 7/2000 Daus
6,228,145 B1 5/2001 Falk-Pedersen et al.
6,478,852 B1 11/2002 Callaghan et al.
6,648,944 B1 11/2003 Baker et al.
7,713,332 B2 5/2010 Bronold
7,763,097 B2 7/2010 Federspiel et al.
7,964,020 B2 6/2011 Baker et al.
9,146,035 B2 * 9/2015 Boulet ............... B01D 53/0462
2008/0011161 A1 1/2008 Finkenrath et al.
2008/0127632 A1 6/2008 Finkenrath et al.
2008/0176174 A1 7/2008 White et al.
2009/0232861 A1 9/2009 Wright et al.
2010/0236404 A1 * 9/2010 Baker .................... B01D 53/22 95/46
2010/0251887 A1 10/2010 Jain
2011/0200491 A1 * 8/2011 Wijmans .............. B01D 53/229 422/169
2011/0260112 A1 * 10/2011 Wijmans ................ B01D 53/22 252/372
2012/0042810 A1 * 2/2012 Niass ....................... F23J 15/02 110/234
2013/0131199 A1 * 5/2013 Lien ....................... B01D 53/22 518/702
2015/0013300 A1 * 1/2015 Axelbaum ............... F23J 15/02 60/39.15
2015/0362188 A1 * 12/2015 Wojak ...................... F23J 15/02 423/222
2016/0102859 A1 * 4/2016 Fisher .................... B01D 53/22 110/345
2016/0256819 A1 * 9/2016 Kulkarni .............. B01D 53/229

* cited by examiner (not in accordance with the invention)

SWEEP-BASED MEMBRANE SEPARATION PROCESS FOR REMOVING CARBON DIOXIDE FROM EXHAUST GASES GENERATED BY MULTIPLE COMBUSTION SOURCES

FIELD OF THE INVENTION

The invention relates to membrane-based gas separation processes, and specifically to sweep-based membrane separation processes to remove carbon dioxide from multiple exhaust gas streams produced from multiple combustion sources.

BACKGROUND OF THE INVENTION

Presented below is background information on certain aspects of the present invention as they may relate to technical features referred to in the detailed description, but not necessarily described in detail. The discussion below should not be construed as an admission as to the relevance of the information to the claimed invention or the prior art effect of the material described.

Exhaust gases from many combustion processes are contaminated with carbon dioxide when emitted into the atmosphere, which contributes to global warming and environmental damage. Such gas streams are difficult to treat in ways that are both technically and economically practical.

Gas separation by means of membranes is a well-established technology. In an industrial setting, a total pressure difference is usually applied between the feed and permeate sides, typically by compressing the feed stream or maintaining the permeate side of the membrane under partial vacuum.

Although permeation by creating a feed to permeate pressure difference is the most common process, it is known in the literature that a driving force for transmembrane permeation may be supplied by passing a sweep gas across the permeate side of the membranes, thereby lowering the partial pressure of a desired permeant on that side to a level below its partial pressure on the feed side. In this case, the total pressure on both sides of the membrane may be the same, the total pressure on the permeate side may be higher than on the feed side, or there may be additional driving force provided by keeping the total feed pressure higher than the total permeate pressure.

One such sweep-based membrane separation process for treating an exhaust gas is presented in co-owned U.S. Pat. No. 7,964,020. A simple flow scheme for that process is shown in FIG. 1.

Referring to this figure, fuel stream 101, and air, oxygen-enriched air or oxygen stream 113, are introduced into a combustion step or zone, 103. Stream 113 is made up of sweep stream, 112, discussed below, and additional air or oxygen supply, stream 102.

Combustion exhaust stream, 104, typically containing 10-20 vol % carbon dioxide, is withdrawn. The stream is sent, at least in part, to carbon dioxide capture step, 105, that produces a concentrated (greater than 60 vol %) carbon dioxide product stream, 106, from the exhaust stream. The concentrated stream, 106, may be further concentrated in a second step and sent for sequestration, or used or disposed of in any other appropriate way.

The off-gas stream, 107, from the capture step still contains carbon dioxide, at a lower concentration than the raw exhaust stream. This concentration may be up to about 10 vol % carbon dioxide for coal-fired boilers, lower for gas-fired boilers. The off-gas stream is sent for treatment in membrane separation step or unit, 108. The unit contains membranes, 109, that are selectively permeable to carbon dioxide over nitrogen and to carbon dioxide over oxygen.

The off-gas flows across the feed side of the membranes; a sweep gas of air, oxygen-enriched air or oxygen, stream 111, flows across the permeate side. The sweep stream picks up the preferentially permeating carbon dioxide, and the resulting permeate stream, 112, is withdrawn from the membrane unit and is combined with stream 102 to form the air or oxygen feed, 113, to the combustor.

The residue stream, 110, is reduced in carbon dioxide content to less than about 5 vol % and is typically discharged to the environment.

Some of the additional beneficial consequences of using the combustion air or oxygen supply as the permeate sweep in this process is that the permeating carbon dioxide removed into the sweep gas is recycled to the combustion chamber. This increases the carbon dioxide concentration in the exhaust gas leaving the combustor, facilitating the downstream capture of carbon dioxide.

Despite the advantages of the above process, at some locations, there are several exhaust streams that contain carbon dioxide, which are produced from multiple combustion processes or units, such as boilers, furnaces, or ovens. As such, implementing multiple carbon capture systems to treat the exhaust streams from each combustion source would be expensive and capital intensive.

Additionally, the above process requires that the operating conditions of the combustion unit be modified since the air stream entering the combustion unit is diluted, resulting in a reduced concentration of oxygen compared to its conventional operation. Since most combustion units are optimized to work within a specific range of oxygen content, any decrease in oxygen levels would affect the efficiency of the combustion unit and the overall plant. For example, when this process is applied to coal power plants, studies have shown that the power plant boiler can operate with an air combustion stream containing as little as 18% oxygen. However, even after the boiler has been modified to work with this oxygen content, the plant will suffer a 1-2% reduction in efficiency. Similarly, natural gas power turbines can operate with as little as 15% oxygen, but again, a reduction in power output results.

Thus, it would be beneficial to develop a single process that is able to treat multiple exhaust gas streams from different combustion sources where a sweep-stream is recycled back to only one of the combustion sources. In this way, the cost of modifying the combustion unit and the loss in efficiency mentioned above would only be incurred by one combustion unit although the carbon dioxide would be captured from several.

SUMMARY OF THE INVENTION

The invention is a process involving sweep-based membrane gas separation for controlling carbon dioxide emissions from more than one combustion process. In a basic embodiment, the invention relates to a process for controlling carbon dioxide exhaust from multiple combustion sources, comprising:

(a) performing a first combustion process by combusting a first mixture of a fuel and air, oxygen-enriched air or oxygen, thereby creating a first exhaust stream comprising carbon dioxide and nitrogen;

(b) performing a carbon dioxide capture step to remove a portion of carbon dioxide in concentrated form from the first exhaust stream, thereby creating an off-gas stream from the capture step that is less concentrated in carbon dioxide than the first exhaust stream;

(c) performing a second combustion process by combusting a second mixture of a fuel and air, oxygen-enriched air or oxygen, thereby creating a second exhaust stream comprising carbon dioxide and nitrogen;

(d) mixing the second exhaust stream with the a portion of the off-gas stream to produce a mixed gas stream;

(e) providing a membrane having a feed side and a permeate side, and being selectively permeable to carbon dioxide over nitrogen and to carbon dioxide over oxygen;

(f) passing the mixed gas stream across the feed side;

(g) passing air, oxygen-enriched air or oxygen as a sweep stream across the permeate side;

(h) withdrawing from the feed side a carbon dioxide-depleted vent stream;

(i) withdrawing from the permeate side a permeate stream comprising oxygen and carbon dioxide; and (j) passing the permeate stream to step (a) as at least part of the air, oxygen-enriched air or oxygen of step (a).

Combustion exhaust streams or off-gases are typically referred to as flue gas, and arise in large quantities from ovens, furnaces and boilers in all sectors of industry, such as incinerators for municipal waste, steam generators for enhanced oil recovery (EOR), gas turbines, coal-fired power plants, or combustion processes in refineries. In particular, power plants generate enormous amounts of flue gas. A modestly sized 100 megawatt coal-based power plant may produce over 300 MMscfd of flue gas.

At many of these sites, there may be multiple, separate emission sources that, together, create a very large total emission source of carbon dioxide. These emission sources may not be the same size or type. However, treating each individual source separately would be prohibitively expensive so there is a need to group the sources for carbon capture as provided herein by the present invention. In this way, the emission source selected to have a carbon dioxide recycle process fitted to it can be chosen based on its likely lowest cost and least impact on overall process efficiency.

The major components of combustion exhaust gases are normally nitrogen, carbon dioxide and water vapor. Other components that may be present, typically only in small amounts, include oxygen, hydrogen, $SO_x$, $NO_x$, and unburnt hydrocarbons. The carbon dioxide concentration in the exhaust gas is generally up to about 20, or even 25 vol %.

In addition to gaseous components, combustion gas contains suspended particulate matter in the form of fly ash and soot. This material is usually removed by several stages of filtration before the gas is sent to the stack. It is assumed herein that the exhaust gas has already been treated in this way prior to carrying out the processes of the invention.

The process of the invention involves treating the filtered exhaust gas to remove carbon dioxide. In preferred embodiments, the carbon dioxide level of the exhaust gas is reduced to as low as 6 vol % or less, and most preferably to about 5 vol % or less. Discharge of such a stream to the environment is much less damaging than discharge of the untreated exhaust.

The combustion processes from which the exhaust is drawn may be of any type. The fuel may be a fossil fuel, such as coal, oil or natural gas, or may be from any other source, such as landfill gas, biomass, or other combustible waste. The fuel may be combusted by mixing with air, oxygen-enriched air or pure oxygen.

After a first (primary) combustion step, a first exhaust gas is first subjected to a carbon dioxide capture step. This capture step removes a portion of the carbon dioxide from the emissions stream, and preferably provides it in the form of a concentrated stream, such as greater than 50, 60, 70 or 80 vol % carbon dioxide, and most preferably as a supercritical fluid or liquid high purity product. The concentrated product stream may be sent for sequestration, or for any other use.

The capture step may utilize any separation technology suitable for recovering carbon dioxide from a stream of the exhaust gas concentration. Preferred technologies are absorption, such as amine scrubbing, physical absorption, chilled ammonia sorption, or membrane separation; condensation; or adsorption by carbon or molecular sieve adsorbents.

The off-gas stream from the capture step still contains carbon dioxide, but normally at a lower concentration than the raw exhaust stream. Typically, this concentration is about 10-20 vol % carbon dioxide.

The off-gas stream is then mixed with a second exhaust stream from a second (ancillary) combustion step to produce a mixed gas stream. The second combustion step may be similar to or different from the first combustion step. Ideally, the second exhaust gas should be mixed with the off-gas stream at a point in the process where both gas streams have about the same concentration of carbon dioxide in the gas. By doing this mixing, losses incurred when gas streams of unequal concentrations are mixed are avoided.

The mixed gas is sent for treatment in a membrane separation unit. The unit contains membranes selectively permeable to carbon dioxide over nitrogen and to carbon dioxide over oxygen. It is preferred that the membrane provide a carbon dioxide permeance of at least about 300 gpu, more preferably at least about 500 gpu and most preferably at least about 1,000 gpu under the operating conditions of the process. A carbon dioxide/nitrogen selectivity of at least about 10 or more preferably 20 under the operating conditions of the process is also desirable.

The mixed gas flows across the feed side of the membranes, and a sweep gas of air, oxygen-enriched air or oxygen flows across the permeate side, to provide or augment the driving force for transmembrane permeation. The sweep stream picks up the preferentially permeating carbon dioxide. The sweep/permeate stream is then withdrawn from the membrane unit and is returned to the first combustor to form at least part of the air, oxygen-enriched air or oxygen feed to the first combustion step.

By using the oxygen-containing stream destined for the first combustor as sweep gas, the membrane separation step is carried out in a very efficient manner, and without introducing any additional unwanted components into the combustion zone.

The process is particularly useful in applications that are energy-sensitive, as is almost always the case when the very large streams from power plants and the like are to be processed. The process is also particularly useful in separations that are pressure-ratio limited, as will be explained in more detail below.

The membrane separation step may be carried out using one or more individual membrane modules. Any modules capable of operating under permeate sweep conditions may be used. Preferably, the modules take the form of hollow-fiber modules, plate-and-frame modules, or spiral-wound modules. All three module types are known, and their configuration and operation in sweep, including counterflow sweep modes, is described in the literature.

The process may use one membrane module, but in most cases, the separation will use multiple membrane modules arranged in series or parallel flow arrangements as is well known in the art. Any number of membrane modules may be used.

The process may be augmented by operating the membrane unit with higher total pressure on the feed side than on the permeate side, thereby increasing the transmembrane driving force for permeation.

It is preferred that the feed gas flow direction across the membrane on the feed side and the sweep gas flow direction across the membrane on the permeate side are substantially countercurrent to each other. In the alternative, the relative flow directions may be substantially crosscurrent, or less preferred, cocurrent.

The residue stream is reduced in carbon dioxide content to less than about 8 vol %, more preferably to less than 6 vol % and most preferably to less than 5 vol %. This stream is typically, although not necessarily, discharged to the environment. The reduction of the carbon dioxide content to 20%, 10% or less of the content in the raw exhaust greatly reduces the environmental impact of discharging the stream.

In some cases, it may be beneficial to treat the exhaust gas streams using more than one sweep-based membrane separation step. Accordingly, in an alternative embodiment, the invention is a process for controlling carbon dioxide exhaust from multiple combustion sources, comprising:

(a) performing a first combustion process by combusting a first mixture of a fuel and air, oxygen-enriched air or oxygen, thereby creating a first exhaust stream comprising carbon dioxide and nitrogen;

(b) performing a carbon dioxide capture step to remove a portion of carbon dioxide in concentrated form from the first exhaust stream, thereby creating an off-gas stream from the capture step that is less concentrated in carbon dioxide than the first exhaust stream;

(c) providing a first membrane having a first feed side and a first permeate side, and being selectively permeable to carbon dioxide over nitrogen and to carbon dioxide over oxygen;

(d) passing the off-gas stream across the first feed side;

(e) withdrawing from the first feed side a first carbon dioxide-depleted stream;

(f) performing a second combustion process by combusting a second mixture of a fuel and air, oxygen-enriched air or oxygen, thereby creating a second exhaust stream comprising carbon dioxide and nitrogen;

(g) mixing at least a portion of the second exhaust stream with at least a portion of the first carbon dioxide-depleted stream to produce a mixed gas stream;

(h) providing a second membrane having a second feed side and a second permeate side, and being selectively permeable to carbon dioxide over nitrogen and to carbon dioxide over oxygen;

(i) passing at least a portion of the mixed gas stream across the second feed side;

(j) withdrawing from the second feed side a second carbon dioxide-depleted stream;

(k) passing at least a portion of air, oxygen-enriched air or oxygen as a first sweep stream across the second permeate side;

(l) withdrawing from the second permeate side a second-membrane permeate stream comprising oxygen and carbon dioxide;

(m) passing at least a portion of the second-membrane permeate stream comprising oxygen and carbon dioxide as a second sweep stream across the first permeate side of the first membrane;

(n) withdrawing from the first permeate side of the first membrane a first-membrane permeate stream comprising oxygen and carbon dioxide; and (o) passing the first-membrane permeate stream to step (a) as at least part of the air, oxygen-enriched air or oxygen of step (a).

In certain aspects, the entire portion of the second-membrane permeate stream is passed as a second sweep stream across the first permeate side of the first membrane. In other aspects, a first portion of the second-membrane permeate stream is passed as the second sweep stream across the first permeate side of the first membrane and a second portion is sent as part of the air, oxygen-enriched air or oxygen used as the feed supply in the first combustion process. Preferably, a gas stream comprising air, oxygen-enriched air, or oxygen is mixed with the first portion of the second-membrane permeate stream so as to be sent as part of the second sweep stream. Even more preferably, this gas stream is withdrawn as a portion of the air, oxygen-enriched air or oxygen used as the first sweep gas.

In another alternative embodiment, the entire portion of second-membrane permeate stream is directed to the first combustion processes as part of the air, oxygen-enriched air or oxygen stream. A second sweep stream comprising air, oxygen-enriched air, or oxygen is passed across the first permeate side of the first membrane. Preferably, a portion of the first sweep gas is withdrawn prior to being passed across the permeate side of the second membrane and is sent to the permeate side of the first membrane as the second sweep stream.

In some embodiments, the first-membrane permeate stream and the second-membrane permeate stream may be sent directly back to the combustor or may be combined prior to being mixed with the air, oxygen-enriched air, or oxygen used in the first combustion process.

The number of exhaust streams discussed above is not to be limiting. Any number of exhaust gas streams from multiple combustion sources may be treated. In certain embodiments, the exhaust streams from additional combustion steps may be combined with the first exhaust stream prior to the carbon capture step, the carbon capture off-gas or the second exhaust stream prior to the two streams being mixed, or the mixed gas stream prior to the membrane separation step, depending on their concentrations with the goal of minimizing mixing losses.

Likewise, in embodiments where more than one sweep-based membrane separation step is used, the additional exhaust gas streams may be combined with the first exhaust stream prior to the carbon capture step, the off-gas stream prior to the first membrane separation step, the residue stream of the first membrane separation step or the second exhaust stream prior to these two streams being mixed together, or the mixed gas stream prior to undergoing treatment in the second membrane separation step.

The location of the mixing of the exhaust streams in the above embodiments will generally be selected to mix streams having substantially the same concentration of carbon dioxide to minimize mixing losses. By "substantially the same", we mean that the ratio of carbon dioxide concentration of the two streams being mixed should be between 0.7 and 1.4. That is, by way of example and referring to FIG. 3, if stream 310 were to contain 10 mol % carbon dioxide, then the preferred carbon dioxide concentration of stream 314 would be between a maximum value of 14.3 mol % (10 mol %/0.7) and a minimum value of 7.1 mol % (10 mol %/1.4). Preferably, the ratio of the two streams should be between 0.8 and 1.2, and most preferably between 0.9 and 1.1.

In addition to treating multiple exhaust streams, another advantage of the present invention is that it only requires one combustion unit to be modified to handle increased levels of carbon dioxide (and lower levels of oxygen) in the air stream from the permeate recycle. The present invention also allows for the primary combustion step and carbon capture step to operate even if an ancillary combustion unit is shut down.

DETAILED DESCRIPTION OF THE INVENTION

The term "gas" as used herein means a gas or a vapor.

The terms "exhaust gas". "flue gas" and "emissions stream" are used interchangeably herein.

The terms "mol %" and "vol %" are used interchangeably herein.

The invention relates to a process for controlling carbon dioxide emissions from multiple combustion processes by sweep-based membrane gas separation, and combustion processes including such gas separation.

Figure 2:
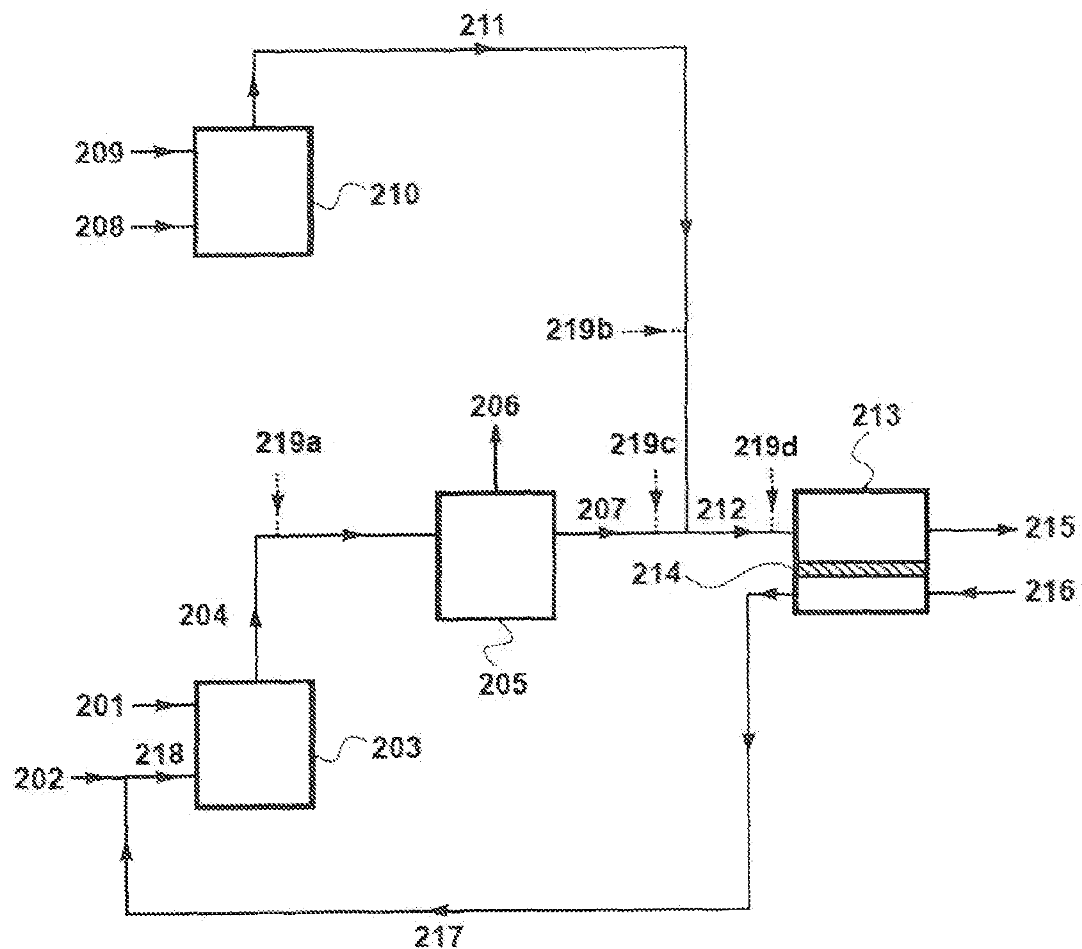
FIG. 2 is a schematic drawing of a flow scheme showing a basic embodiment of the sweep-based membrane separation process for removing carbon dioxide from exhaust gases from more than one combustion unit.

A simple flow scheme for a basic embodiment of the invention is shown in FIG. 2, where carbon dioxide is removed from exhaust gases emanating from two combustion steps or zones. A first fuel stream 201, and a first air, oxygen-enriched air or oxygen stream 218, are introduced into a first combustion step or zone, 203. Stream 218 is made up of permeate stream, 217, discussed below, and an additional first air or oxygen supply stream 202.

A first combustion exhaust stream, 204, typically containing 15-25 vol % carbon dioxide, is withdrawn. This stream usually contains at least carbon dioxide, water vapor and nitrogen, as well as the other components mentioned above.

The stream is sent, at least in part, to a carbon dioxide capture step, 205. This step may be carried out using any technology or combination of technologies that can create a concentrated carbon dioxide stream from the exhaust stream as discussed above.

The capture step yields a concentrated carbon dioxide product stream, 206, preferably containing greater than 50, 60, 70, or 80 vol % carbon dioxide or more. This stream may be in the gas or liquid phase, and may comprise purified liquid carbon dioxide, for example. The concentrated stream may be sent for sequestration, or used or disposed of in any other appropriate way.

The off-gas stream, 207, from the capture step still contains carbon dioxide, at a lower concentration than the first exhaust stream. Typically, but not necessarily, this concentration is about 10-20 vol % carbon dioxide for coal-fired boilers, lower for gas-fired boilers.

In a second combustion step or zone, 210, a second fuel stream 209, and a second air or oxygen supply, stream 208, are introduced into it.

A second combustion exhaust stream, 211, typically containing 5-15 vol % carbon dioxide, is withdrawn. Typically, this stream contains similar components as the first combustion exhaust stream.

Second exhaust stream 211 is sent, at least in part, to be mixed with the off-gas stream, 207, from the carbon capture step, 205, to produce a mixed gas stream, 212.

The mixed gas stream, 212, is sent for treatment in membrane separation step or unit, 213. The step uses membranes, 214, that are selectively permeable to carbon dioxide over nitrogen and to carbon dioxide over oxygen.

The mixed gas flows across the feed side of the membranes; a sweep gas of air, oxygen-enriched air or oxygen, stream 216, flows across the permeate side.

The sweep stream picks up the preferentially permeating carbon dioxide, and the resulting permeate stream, 217, is withdrawn from the membrane and is combined with stream 202 to form the air or oxygen feed, 218, to the combustor.

In the alternative, stream 202 may be omitted and the entirety of the oxygen-containing feed to the combustor may be provided by the permeate stream 217.

The residue stream, 215, is reduced in carbon dioxide content to less than about 8 vol %, more preferably to less than 6 vol % and most preferably to less than 5 vol %. Typically, this stream is discharged to the environment One of the additional beneficial consequences of using the combustion air or oxygen supply as the permeate sweep is that the permeating carbon dioxide removed into the sweep gas is recycled to the combustion chamber. This increases the carbon dioxide concentration in the exhaust gas leaving the combustor, facilitating the downstream capture of carbon dioxide. For example, conventional combustion of coal with air usually produces an off-gas containing 10-12% carbon dioxide, whereas returning carbon dioxide to the combustion chamber in accordance with the teachings herein can increase the exhaust gas concentration to about 15 or 20 vol %.

First exhaust stream, 204, off-gas stream, 207, and/or second exhaust stream, 211, may optionally be combined with an ancillary exhaust stream or streams, 219*a-d*, from additional combustion processes (not shown). Preferably, the ancillary exhaust stream(s) is combined at a point where the stream it is to be mixed with has substantially the same concentration of carbon dioxide as with the ancillary stream.

From FIG. 2, it may be seen that the process of the invention incorporates four unit operations: two combustion steps, a carbon capture step and a final membrane separation step.

The combustion steps may be carried out in any way limited only in that it results in an exhaust gas or flue gas containing carbon dioxide. Such combustion processes occur throughout industrialized society. Representative processes include those in which the combustion step is used to provide heat for an oven or furnace, such as a blast furnace. Other important processes are those in which the combustion step is used to generate steam to operate a turbine or other equipment to perform mechanical work or generate electric power. In yet other processes, the combustion gases themselves are used as a source of power to drive a turbine or the like, and may be treated before or after they have been used in the turbine. Yet, another source are steam boilers used in enhanced oil recovery (EOR) operations, where the generated carbon dioxide stream is injected into an oil formation.

The fuel for the combustion step may be any fuel that can be combusted with oxygen, including, but not limited to, coal, coke, wood, biomass, solid wastes, oils and other natural and synthetic liquid fuels of all grades and types, and hydrocarbon-containing gas of any type, such as natural gas, landfill gas, coal mine gas or the like.

The oxygen with which the fuel is combusted may be supplied in the form of high purity oxygen, oxygen-enriched air, normal air or any other suitable oxygen-containing mixture.

The carbon capture step may be carried out using membrane or non-membrane technology, and may involve one or more than one type of separation procedure. In the event that membrane technology is used in whole or part for this step, the capture step remains a discrete unit operation separate from the subsequent membrane separation step, 214. Preferably, the membrane used in the carbon capture step is the same as, and has similar properties to, the membrane used in the sweep-based membrane separation step.

Representative methods that may be used to capture carbon dioxide in this step include, but are not limited to, physical or chemical sorption, membrane separation, compression/low temperature condensation, adsorption, or any other known technology. Preferred technologies are absorption, such as amine scrubbing or chilled ammonia sorption, condensation, membrane separation, and combinations of these.

Low-temperature or cryogenic condensation and absorption into an amine solution are the most common methods in current industrial use for capturing carbon dioxide and need no detailed description herein. Either method is well suited for use in the present invention. Methods of recovering liquid carbon dioxide by cryogenic condensation or distillation are well known in the art. A preferred process is the well-known Ryan-Holmes process, in which a light hydrocarbon liquid or liquid mixture is added to the column to prevent formation of carbon dioxide solids or azeotropes in the column. Various specific techniques for carrying out low temperature condensation are taught, for example in U.S. Pat. Nos. 4,371,381; 4,923,493; 5,233,837. The Ryan-Holmes process is taught in U.S. Pat. Nos. 4,350,511 and 4,462,814, for example.

Methods of recovering carbon dioxide by absorption are also commonly used. In brief, these methods involve absorbing the carbon dioxide into a sorbent solution by physical or chemical interaction, then stripping the gas from the solution by reducing its pressure or heating the solution and then recirculating the regenerated sorbent. Various sorbents may be used; most commonly the sorbent is amine-based and may include a single alkanolamine or a mix of amines. Other sorbents that may be used include chilled ammonia, as in the Alstom process, or other specialized proprietary solvents or solutions of carbon dioxide absorbing salts, such as potassium bicarbonate.

The sorbent solution may be regenerated by steam stripping, and the carbon dioxide recovered from the stripping vapor by cooling and condensing the water. A representative process of this type that may be used is the Fluor Daniel Econamine FG™ process, which uses a monoethanolamine (MEA) based sorbent system. Very detailed descriptions of such processes can be found in the literature, for example in *Gas Purification*, A. Kohl and R. Nielsen (Fifth Edition, Gulf Publishing Co., Houston, Tex., 1997), pages 1188-1237.

It is less preferred to use membrane separation alone for the carbon dioxide capture step as it is hard to reach a high carbon dioxide concentration in the permeate stream without using multiple membrane stages. An example of a three-stage membrane unit for carbon dioxide recovery from natural gas streams is given U.S. Pat. No. 6,648,944.

Two or more different separation technologies may also be combined in this step; membrane separation may be combined with cryogenic condensation, either upstream or downstream of the condensation step, for example, or gas released in the stripping step of the absorption process may be liquefied by condensation. Examples of such combined processes are taught in U.S. Pat. Nos. 4,639,257; 4,990,168; 5,233,837; and 6,085,549, for example, all of which are incorporated herein by reference.

The fourth unit operation is sweep-based membrane separation. The membranes used in this step should exhibit high permeance for carbon dioxide, as well as high selectivity for carbon dioxide over nitrogen.

Any membrane with suitable performance properties may be used. Many polymeric materials, especially elastomeric materials, are very permeable to carbon dioxide. Preferred membranes for separating carbon dioxide from nitrogen or other inert gases have a selective layer based on a polyether. A number of such membranes are known to have high carbon dioxide/nitrogen, such as 30, 40, 50 or above. A representative preferred material for the selective layer is Pebax®, a polyamide-polyether block copolymer material described in detail in U.S. Pat. No. 4,963,165.

The membrane may take the form of a homogeneous film, an integral asymmetric membrane, a multilayer composite membrane, a membrane incorporating a gel or liquid layer or particulates, or any other form known in the art. If elastomeric membranes are used, the preferred form is a composite membrane including a microporous support layer for mechanical strength and a thin rubbery coating layer that is responsible for the separation properties.

The membranes may be manufactured as flat sheets or as fibers and housed in any convenient module form, including spiral-wound modules, plate-and-frame modules and potted hollow-fiber modules. The making of all these types of membranes and modules is well known in the art. To provide countercurrent flow of the sweep gas stream, the modules preferably take the form of hollow-fiber modules, plate-and-frame modules or spiral-wound modules.

Flat-sheet membranes in spiral-wound modules are the most preferred choice for the membrane/module configuration. A number of designs that enable spiral-wound modules to be used in counterflow mode with or without sweep on the permeate side have been devised. A representative example is described in U.S. Pat. No. 5,034,126, to Dow Chemical.

Membrane step or unit 213 may contain a single membrane module or bank of membrane modules or an array of modules. A single unit or stage containing one or a bank of membrane modules is adequate for many applications. If the residue stream requires further purification, it may be passed to a second bank of membrane modules for a second processing step. If the permeate stream requires further concentration, it may be passed to a second bank of membrane modules for a second-stage treatment. Such multi-stage or multi-step processes, and variants thereof, will be familiar to those of skill in the art, who will appreciate that the membrane separation step may be configured in many possible ways, including single-stage, multistage, multistep, or more complicated arrays of two or more units in serial or cascade arrangements.

Turning to the operating conditions of step 213, the separation of components achieved by the membrane unit depends not only on the selectivity of the membrane for the components to be separated, but also on the pressure ratio.

By pressure ratio, we mean the ratio of total feed pressure/total permeate pressure. In pressure driven processes, it can be shown mathematically that the enrichment of a component (that is, the ratio of component permeate partial pressure/component feed partial pressure) can never be greater than the pressure ratio. This relationship is true, irrespective of how high the selectivity of the membrane may be.

Further, the mathematical relationship between pressure ratio and selectivity predicts that whichever property is numerically smaller will dominate the separation. Thus, if the numerical value of the pressure ratio is much higher than the selectivity, then the separation achievable in the process will not be limited by the pressure ratio, but will depend on the selectivity capability of the membranes. Conversely, if the membrane selectivity is numerically very much higher than the pressure ratio, the pressure ratio will limit the separation. In this case, the permeate concentration becomes essentially independent of the membrane selectivity and is determined by the pressure ratio alone.

High pressure ratios can be achieved by compressing the feed gas to a high pressure or by using vacuum pumps to create a lowered pressure on the permeate side, or a combination of both. However, the higher the selectivity, the more costly in capital and energy it becomes to achieve a pressure ratio numerically comparable with or greater than the selectivity.

From the above, it can be seen that pressure-driven processes using membranes of high selectivity for the components to be separated are likely to be pressure-ratio limited. For example, a process in which a membrane selectivity of 40, 50 or above is possible (such as is the case for many carbon dioxide/nitrogen separations) will only be able to take advantage of the high selectivity if the pressure ratio is of comparable or greater magnitude.

The inventors have overcome this problem and made it possible to utilize more of the intrinsic selective capability of the membrane by diluting the permeate with the sweep gas, stream 216, thereby preventing the permeate side concentration building up to a limiting level.

This mode of operation can be used with a pressure ratio of 1, that is, with no total pressure difference between the feed and permeate sides, with a pressure ratio less than 1, that is, with a higher total pressure on the permeate side than on the feed side, or with a relatively modest pressure ratio of less than 10 or less than 5, for example.

The driving force for transmembrane permeation is supplied by lowering the partial pressure of the desired permeant on the permeate side to a level below its partial pressure on the feed side. The use of the sweep gas stream 216 maintains a low carbon dioxide partial pressure on the permeate side, thereby providing driving force.

The partial pressure on the permeate side may be controlled by adjusting the flow rate of the sweep stream to a desired value. In principle the ratio of sweep gas flow to feed gas flow may be any value that provides the desired results, although the ratio sweep gas flow:feed gas flow will seldom be less than 0.1 or greater than 10. High ratios (that is, high sweep flow rate) achieve maximum carbon dioxide removal from the feed, but a comparatively carbon dioxide dilute permeate stream (that is, comparatively low carbon dioxide enrichment in the sweep gas exiting the modules). Low ratios (that is, low sweep flow rate) achieve high concentrations of carbon dioxide in the permeate, but relatively low levels of carbon dioxide removal from the feed.

Use of a too low sweep rate may provide insufficient driving force for a good separation, and use of an overly high sweep flow rate may lead to pressure drop or other problems on the permeate side, or may adversely affect the stoichiometry in the reaction vessel.

Typically and preferably, the flow rate of the sweep stream should be between about 50% and 200% of the flow rate of the membrane feed stream, and most preferably between about 80% and 120%. Often a ratio of about 1:1 is convenient and appropriate.

The total gas pressures on each side of the membrane may be the same or different, and each may be above or below atmospheric pressure. As mentioned above, if the pressures are about the same, the entire driving force is provided by the sweep mode operation.

In most cases, however, the exhaust gas is available at atmospheric pressure, and the volumes of the streams involved are so large that it is not preferred to use either significant compression on the feed side or vacuum on the permeate side. However, slight compression, such as from atmospheric to 2 or 3 bar, can be helpful and can provide part of a total carbon dioxide capture and recovery process that is relatively energy efficient.

Figure 3:
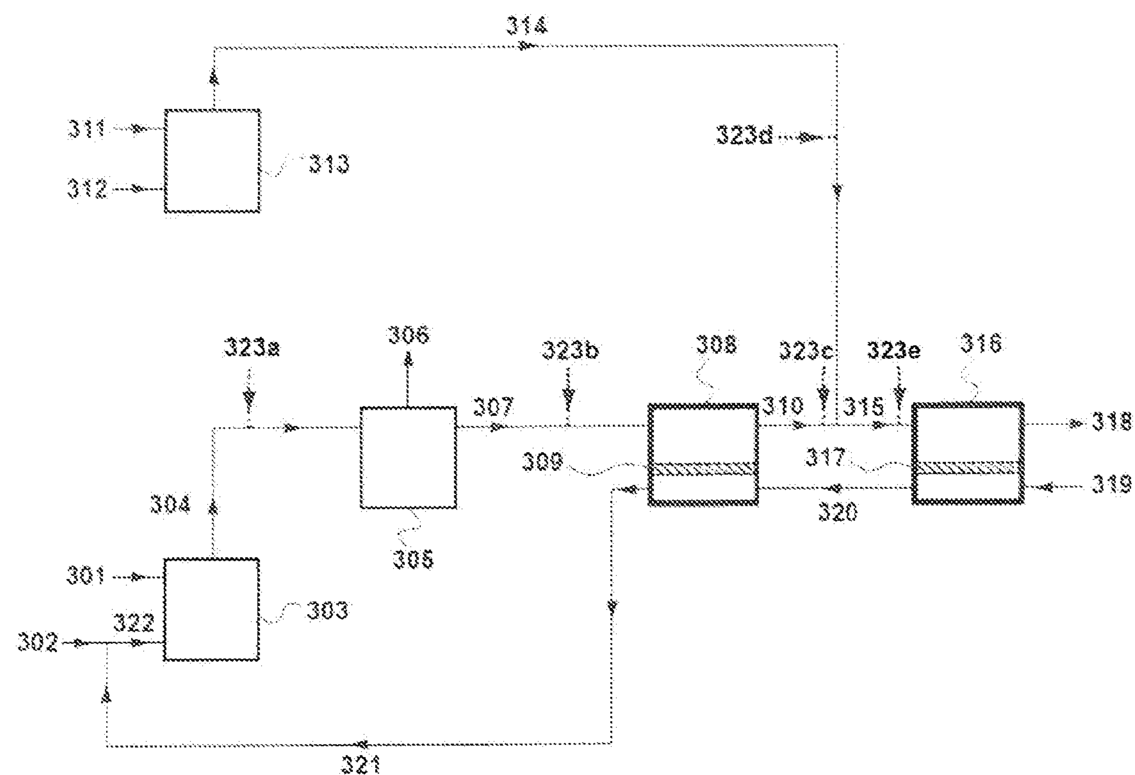
FIG. 3 is a schematic drawing of a flow scheme showing an embodiment of a sweep-based membrane separation process for removing carbon dioxide from exhaust gases from more than one combustion unit using two sweep-based membrane separation steps.

The process in an embodiment which includes more than one sweep-based membrane separation step is shown in FIG. 3. It will be appreciated by those of skill in the art that this, like FIG. 2, is a very simple block diagram, intended to make clear the key unit operations of the process of the invention, and that an actual process train will usually include many additional steps of a standard type, such as heating, chilling, compressing, condensing, pumping, various types of separation and/or fractionation, as well as monitoring of pressures, temperatures and flows, and the like. It will also be appreciated by those of skill in the art that the details of the unit operations may differ from case to case.

Referring to FIG. 3, a fuel stream 301, and an air, oxygen-enriched air or oxygen stream 322, are introduced into a first combustion step or zone, 303. Stream 322 is made up of permeate stream, 321, discussed below, and an additional first air or oxygen supply stream 302.

A first combustion exhaust stream, 304, is sent, at least in part, to a carbon capture step, 305. This step may be carried out using any technology or combination of technologies that can create a concentrated carbon dioxide stream from the exhaust stream, such as those mentioned above. This step separates the exhaust stream into a carbon dioxide concentrated stream, 306, and a carbon dioxide depleted off-gas stream, 307.

The concentrated carbon dioxide product stream, 306, preferably contains greater than 50, 60, 70, or 80 vol % carbon dioxide or more. This stream may be in the gas or liquid phase, and may comprise purified liquid carbon dioxide, for example. The concentrated stream may be sent for sequestration, or used or disposed of in any other appropriate way.

The concentrated stream will also typically be rich in water vapor, which may be easily condensed by cooling the stream. Optionally, the concentrated stream may be sent to compression/low-temperature condensation or distillation to form a high purity carbon dioxide product (not shown).

The off-gas stream, 307, from the capture step still contains carbon dioxide, at a lower concentration than the first exhaust stream. Typically, but not necessarily, this concentration is about 10-20 vol % carbon dioxide for coal-fired boilers, lower for gas-fired boilers.

Off-gas stream 307 is passed as feed to a first membrane separation step, 308, containing membranes, 309, that are selectively permeable to carbon dioxide over nitrogen and to carbon dioxide over oxygen.

A first residue stream, 310, depleted in carbon dioxide is withdrawn from the membrane and mixed with a second combustion exhaust stream, 314, to produce a mixed gas stream, 315.

The second combustion exhaust stream, 314, is produced by a second combustion step or zone, 313. A second fuel stream 311, and a second air or oxygen supply stream 312, are introduced into combustion step, 313. Preferably, this stream contains a substantially similar concentration of carbon dioxide as the first residue stream.

The mixed gas stream, 315, flows across a feed side of a second membrane separation step, 316. A first sweep gas of air, oxygen-enriched air or oxygen, stream 319, is introduced to the permeate side inlet of a second membrane unit, 316, and flows across the permeate side, preferably in a flow pattern that is at least partly or substantially countercurrent to the flow pattern on the feed side. The ratio of the inlet flow rates of the feed and sweep streams is typically about 2:1.

The first sweep stream picks up the preferentially permeating carbon dioxide, and the resulting permeate stream (second-membrane permeate stream), 320, is withdrawn from the second membrane unit, 316, and is sent as a second sweep stream to the first membrane separation unit, 308. In this step, the ratio of the inlet flow of the off-gas stream, 307, to the sweep gas, 320, is roughly 1:1.

In some embodiments, a gas stream comprising air, oxygen-enriched air, or oxygen may be mixed with stream 320 to form part of the second sweep stream (not shown).

The second sweep stream also picks up preferentially permeating carbon dioxide from this step, and the resulting permeate stream (first-membrane permeate stream), 321, is withdrawn from the first membrane unit, 308, and is combined with stream 302 to form the air or oxygen feed, 322, to the combustion unit, 303.

Optionally, stream 302 may be omitted and the entirety of the oxygen-containing stream may be provided by permeate stream 321.

The second residue stream (vent stream), 318, is depleted in carbon dioxide and is discharged from the process. By following the teachings of the invention, it is possible to reduce the carbon dioxide concentration of the discharged exhaust gas by at least 80%, 90%, or more compared with the concentration in the raw flue gas. For example, the off-gas from the combustor may contain 20 mol % carbon dioxide and the residue vent gas may contain only 6 mol % or less carbon dioxide. However, in many operations, less removal is necessary and the carbon dioxide capture rate from both exhaust gases taken together in in the range of about 40 to 60%.

Such a high level of removal is practically impossible with processes that are purely pressure driven, as the energy requirements to operate the process and the membrane area needed to reach the desired levels of carbon dioxide permeation are excessive.

First exhaust stream, 304, off-gas stream, 307, first carbon dioxide-depleted residue stream, 310, and/or second exhaust stream, 314, may optionally be combined with an ancillary stream or streams, 323*a-e*, from additional combustion processes (not shown). Preferably, the ancillary stream(s) is combined at a point where the stream it is to be mixed with has substantially the same concentration of carbon dioxide as with the ancillary stream.

Figure 4:
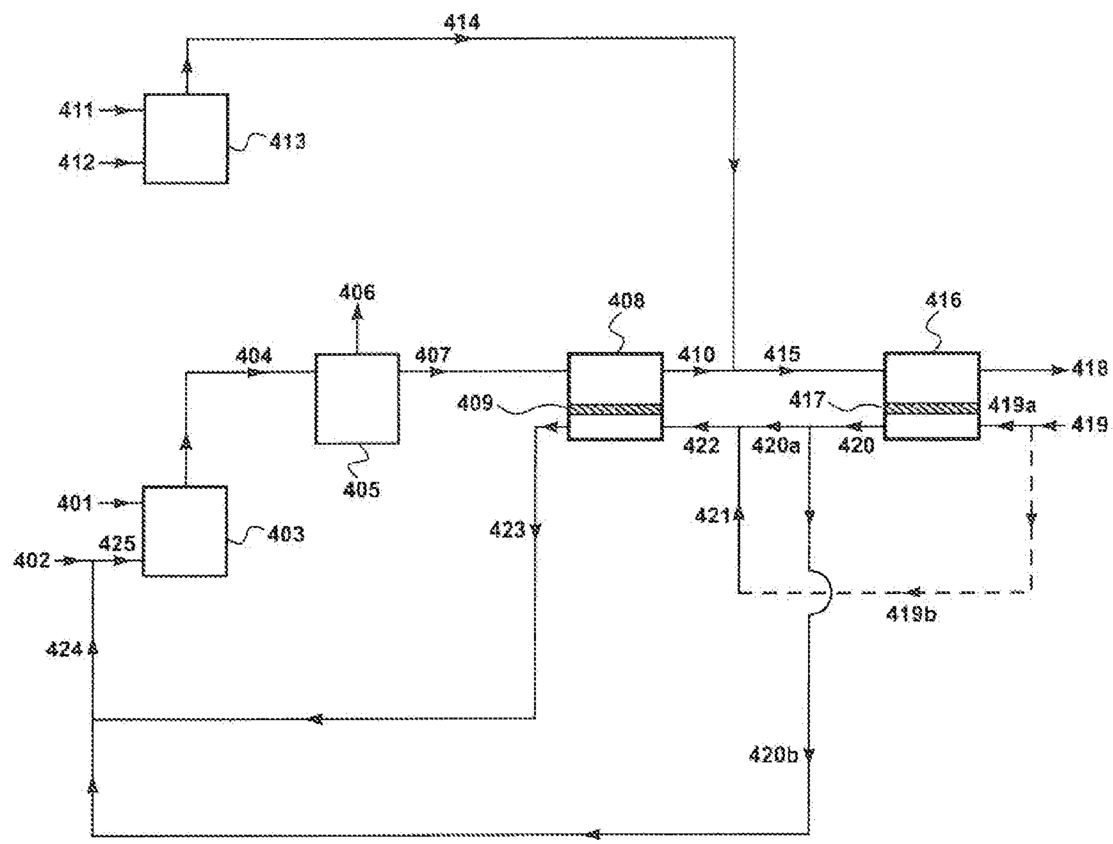
FIG. 4 is an alternative embodiment of FIG. 3 in which one portion of the second-membrane permeate stream is sent as part of the second sweep stream to the first membrane unit and another portion is sent as to the first combustion unit.

An embodiment in which one portion of the second-membrane permeate stream is sent as part of the second sweep stream to the first membrane separation step and a second portion is sent as part of the air or oxygen supply stream of the first combustion step is depicted in FIG. 4.

Referring to this figure, a first fuel stream 401, and an air, oxygen-enriched air or oxygen stream 425, are introduced into a first combustion step or zone, 403. Stream 425 is made up of combined permeate stream 424, which comprises first-membrane permeate stream 423 and second-membrane permeate stream 420*b*, discussed below, and an additional first air or oxygen supply stream 402.

A first combustion exhaust stream, 404, is sent, at least in part, to a carbon capture step, 405. This step may be carried out using any technology or combination of technologies that can create a concentrated carbon dioxide stream from the exhaust stream, such as those mentioned above. This step separates the exhaust stream into a carbon dioxide concentrated stream, 406, and a carbon dioxide depleted off-gas stream, 407.

The concentrated carbon dioxide product stream, 406, preferably contains greater than 50, 60, 70, or 80 vol % carbon dioxide or more. This stream may be in the gas or liquid phase, and may comprise purified liquid carbon dioxide, for example. The concentrated stream may be sent for sequestration, or used or disposed of in any other appropriate way.

The concentrated stream will also typically be rich in water vapor, which may be easily condensed by cooling the stream. Optionally, the concentrated stream may be sent to compression/low-temperature condensation or distillation to form a high purity carbon dioxide product (not shown).

The off-gas stream, 407, from the capture step still contains carbon dioxide, at a lower concentration than the first exhaust stream. Typically, but not necessarily, this concentration is about 10-20 vol % carbon dioxide for coal-fired boilers, lower for gas-fired boilers.

Off-gas stream 407 is passed as feed to a first membrane separation step, 408, containing membranes, 409, that are selectively permeable to carbon dioxide over nitrogen and to carbon dioxide over oxygen.

A first residue stream, 410, depleted in carbon dioxide is withdrawn from the membrane and mixed with a second combustion exhaust stream, 414, to produce a mixed gas stream, 415.

The second combustion exhaust stream, 414, is produced by a second combustion step or zone, 413. A second fuel stream 411, and a second air or oxygen supply stream 412, are introduced into combustion step, 413. Preferably, this stream contains a substantially similar concentration of carbon dioxide as the first residue stream.

The mixed gas stream, 415, flows across a feed side of a second membrane separation step, 416. A first sweep gas of air, oxygen-enriched air or oxygen, stream 419, is introduced to the permeate side inlet of a second membrane unit, 416, and flows across the permeate side, preferably in a flow pattern that is at least partly or substantially countercurrent to the flow pattern on the feed side.

The first sweep stream picks up the preferentially permeating carbon dioxide, and the resulting permeate stream (second-membrane permeate stream), 420, is withdrawn from the second membrane unit, 416. A first portion of permeate stream 420, 420*a*, is mixed with a gas stream, 421, comprising air, oxygen-enriched air or oxygen, to produce a second sweep stream, 422, which is sent across the permeate side of the first membrane separation unit, 408.

The second sweep stream 422 also picks up preferentially permeating carbon dioxide from this step, and the resulting permeate stream (first-membrane permeate stream), 423, is withdrawn from the first membrane unit, 408. Permeate stream 423 may be combined with stream 420*b*, which is the portion of the second-membrane permeate stream that was not sent as part of the second sweep stream, to produce a mixed permeate stream 424. Mixed permeate stream 424 is combined with stream 402 to form the air or oxygen feed, 425, to the combustion unit, 403.

Optionally, stream 402 may be omitted and the entirety of the oxygen-containing stream may be provided by stream 424.

FIG. 4 also depicts an option where one portion of stream, 419, stream 419*a*, is sent as the first sweep stream to the permeate side of the second membrane unit, 416, and a second portion of stream 419, stream 419*b*, is sent as gas stream 421 to form part of the second sweep stream, 422.

Figure 5:
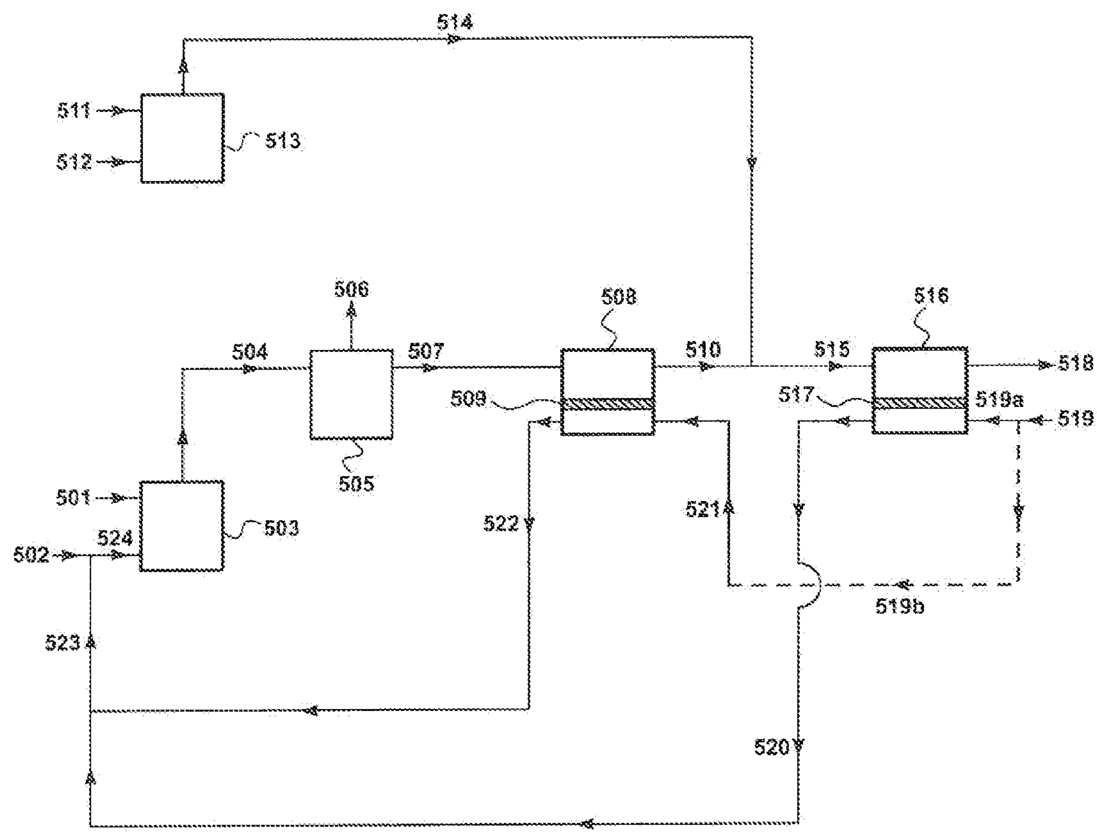
FIG. 5 is an alternative embodiment of FIG. 3 in which the entire second-membrane permeate stream is directed back to the first combustion unit.

An embodiment in which the entire portion of the second-membrane permeate stream is sent as part of the air or oxygen supply stream to the first combustion step is depicted in FIG. 5.

Referring to this figure, a first fuel stream 501, and an air, oxygen-enriched air or oxygen stream 524, are introduced into a first combustion step or zone, 503. Stream 524 is made up of mixed permeate stream 523, which comprises first-membrane permeate stream 522 and second-membrane permeate stream 520, discussed below, and an additional first air or oxygen supply stream 502.

A first combustion exhaust stream, 504, is sent, at least in part, to a carbon capture step, 505. This step may be carried out using any technology or combination of technologies that can create a concentrated carbon dioxide stream from the exhaust stream, such as those mentioned above. This step separates the exhaust stream into a carbon dioxide concentrated stream, 506, and a carbon dioxide depleted off-gas stream, 507.

The concentrated carbon dioxide product stream, 506, preferably contains greater than 50, 60, 70, or 80 vol % carbon dioxide or more. This stream may be in the gas or liquid phase, and may comprise purified liquid carbon dioxide, for example. The concentrated stream may be sent for sequestration, or used or disposed of in any other appropriate way.

The concentrated stream will also typically be rich in water vapor, which may be easily condensed by cooling the stream. Optionally, the concentrated stream may be sent to compression/low-temperature condensation or distillation to form a high purity carbon dioxide product (not shown).

The off-gas stream, 507, from the capture step still contains carbon dioxide, at a lower concentration than the first exhaust stream. Typically, but not necessarily, this concentration is about 10-20 vol % carbon dioxide for coal-fired boilers, lower for gas-fired boilers.

Off-gas stream 507 is passed as feed to a first membrane separation step, 508, containing membranes, 509, that are selectively permeable to carbon dioxide over nitrogen and to carbon dioxide over oxygen.

A first residue stream, 510, depleted in carbon dioxide is withdrawn from the membrane and mixed with a second combustion exhaust stream, 514, to produce a mixed gas stream, 515.

The second combustion exhaust stream, 514, is produced by a second combustion step or zone, 513. A second fuel stream 511, and a second air or oxygen supply stream 512, are introduced into combustion step, 513. Preferably, this stream contains a substantially similar concentration of carbon dioxide as the first residue stream.

The mixed gas stream, 515, flows across a feed side of a second membrane separation step, 516. A first sweep gas of air, oxygen-enriched air or oxygen, stream 519, is introduced to the permeate side inlet of a second membrane unit, 516, and flows across the permeate side, preferably in a flow pattern that is at least partly or substantially countercurrent to the flow pattern on the feed side.

The first sweep stream picks up the preferentially permeating carbon dioxide, and the resulting permeate stream (second-membrane permeate stream), 520, is withdrawn from the second membrane unit, 516.

A second sweep stream, 521, comprising air, oxygen-enriched air or oxygen, is sent across the permeate side of the first membrane separation unit, 508.

The second sweep stream 521 also picks up preferentially permeating carbon dioxide from this step, and the resulting permeate stream (first-membrane permeate stream), 522, is withdrawn from the first membrane unit, 508, and is combined with stream 520 to produce a mixed permeate stream 523. Stream 523 is combined with stream 502 to form the air or oxygen feed, 524, to the combustion unit, 503.

Optionally, stream 502 may be omitted and the entirety of the oxygen-containing stream may be provided by stream 523.

FIG. 5 also depicts an option where one portion of stream 519, stream 519*a*, is sent as the first sweep stream to the permeate side of the second membrane unit, 516, and a second portion of stream 519, stream 519*b*, forms the second sweep stream, 521.

The invention is now illustrated in further detail by specific examples. These examples are intended to further clarify the invention, and are not intended to limit the scope in any way.

EXAMPLES

The following examples are based on the use of two steam boilers, each of which processes about 365 kg per hour of methane (natural gas). Each boiler produces 5,800 $m^3$ of exhaust gas per hour that contains about 1 ton of carbon dioxide. The following examples describe the ability of membranes to separate 0.8 tons of concentrated carbon dioxide (or 40% of the total carbon dioxide emitted). The membranes used have a carbon dioxide permeance of 2,500 gpu, a nitrogen permeance of 100 gpu, an oxygen permeance of 200 gpu and a water permeance of 5,000 gpu.

The boilers used in these calculations are small compared to those used in most industrial operations. However, we have based our calculations on a boiler emitting 1 ton/h carbon dioxide since it allows easy conversion to larger units of any size.

All calculations were performed with a modeling program, ChemCad 5.5 (ChemStations, Inc., Houston, Tex.), containing code for the membrane operation developed by MTR's engineering group. For the calculations, all compressors and vacuum pumps were assumed to be 85% efficient. In each case, the modeling calculation was performed to achieve 40% capture of carbon dioxide from the exhaust gas stream (or 0.8 tons/hour carbon dioxide).

It was further assumed that a membrane separation unit was used as the carbon capture unit.

Example 1

Combustion Process with No Carbon Capture or Sweep-Based Membrane Separation (not in Accordance with the Invention)

As a comparative example, a computer calculation was performed to determine the chemical composition of untreated exhaust gas from a steam boiler. The exhaust gas was cooled to 30° C. at atmospheric pressure to remove some of the water vapor, which was then emitted into the atmosphere. Results are shown in Table 1.

TABLE 1

| Gas Stream | Exhaust Gas from Boiler | Condensed Water Vapor | Cooled Exhaust Gas |
|---|---|---|---|
| Total Flow ($m^3$/h) | 6,580 | 774 | 5,800 |
| Pressure (bara) | 1.0 | 1.0 | 1.0 |
| Temp (° C.) | 180 | 40 | 40 |
| | Component (mol %) | | |
| $H_2O$ | 15.5 | 99.9 | 4.2 |
| $N_2$ | 72.9 | — | 82.5 |
| $O_2$ | 3.9 | — | 4.4 |
| $CO_2$ | 7.7 | — | 8.8 |

One boiler emits about 1 ton/h of carbon dioxide (2 ton/h of carbon dioxide for two boilers). The cooled exhaust gas has a concentration of about 8.8 mol % carbon dioxide.

Example 2

Figure 1:
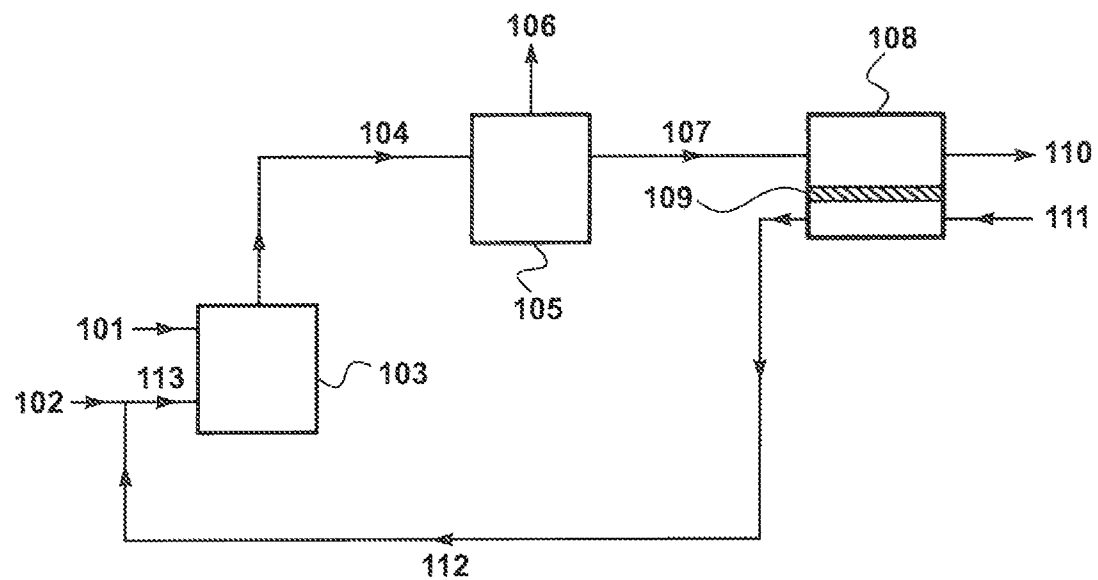
FIG. 1 is a schematic drawing of a flow scheme for a sweep-based membrane separation process for removing carbon dioxide from an exhaust gas of only one combustion unit (not in accordance with the invention).

Combustion Process with Sweep-Based Membrane Separation According to FIG. 1 (not in Accordance with the Invention)

A computer calculation was performed to determine the composition of the process streams from just one boiler. Because the boiler exhausts were treated separately, two capture systems were needed, one for each boiler.

Prior to the carbon capture step, the exhaust stream, 104, is cooled and pressurized from 1.0 to 1.1 bara with a blower to circulate the gas through the process (not shown in the figure).

The results of the calculation are show in Table 2.

TABLE 2

| Gas Stream | Boiler Exhaust (104) | $CO_2$ Concentrate (106) | Off-Gas (107) | Vent Gas (110) | Permeate Stream (112) |
|---|---|---|---|---|---|
| Total Flow ($m^3$/h) | 8,060 | 332 | 7,730 | 6,240 | 8,490 |
| Pressure (bara) | 1.1 | 0.2 | 1.1 | 1.0 | 0.9 |
| Temp (° C.) | 40 | 40 | 40 | 30 | 40 |
| | | Component (mol %) | | | |
| $H_2O$ | 42.2 | 15.8 | 3.7 | 0.5 | 3.0 |
| $N_2$ | 71.4 | 19.6 | 73.6 | 81.6 | 67.8 |
| $O_2$ | 3.2 | 1.7 | 3.2 | 7.1 | 15.0 |
| $CO_2$ | 21.2 | 63.0 | 19.4 | 4.8 | 14.2 |

The calculated membrane area and net energy required for one of the two boiler capture units employed were as follows:

Membrane area: 4,020 $m^2$ (8,040 $m^2$ for both boilers)

Energy usage (from blowers and vacuum pumps used): 87.2 kW/h per ton of carbon dioxide separated (174.4 kW/h per ton of carbon dioxide separated for both boilers)

As can be seen, the concentrated carbon dioxide stream, 106, is enriched in carbon dioxide to a concentration of 63 mol % carbon dioxide (75 mol % on a dry basis) while the vent gas contains about 5 mol % carbon dioxide (approximately 0.6 tons of carbon dioxide).

Example 3

Combustion Process with Sweep-Based Membrane Separation According to FIG. 2

A calculation was performed to illustrate the treatment of exhaust gases from two boilers using a single capture unit as illustrated in FIG. 2. The results of the calculation are shown in Table 3.

TABLE 3

| Gas Stream | First Exhaust (204) | $CO_2$ Concentrate (206) | Off-gas (207) | Second Exhaust (211) | Mixed Gas (212) | Vent Gas (215) | Permeate Stream (217) |
|---|---|---|---|---|---|---|---|
| Total flow ($m^3$/h) | 8,010 | 760 | 7,250 | 5,930 | 13,190 | 11,910 | 8,490 |
| Pressure (bara) | 1.1 | 0.2 | 1.1 | 1.1 | 1.1 | 1.0 | 0.9 |
| Temp (° C.) | 40 | 40 | 40 | 45 | 42 | 35 | 42 |
| | | | | Component (mol %) | | | |
| $H_2O$ | 4.2 | 15.5 | 3.1 | 3.9 | 3.4 | 1.2 | 3.6 |
| $N_2$ | 75.2 | 28.1 | 80.1 | 82.7 | 81.3 | 87.3 | 70.9 |
| $O_2$ | 3.2 | 2.2 | 3.3 | 4.8 | 4.0 | 6.4 | 15.0 |
| $CO_2$ | 17.4 | 54.2 | 13.6 | 8.6 | 11.3 | 5.1 | 10.5 |

Compared Example 2, the total membrane area required for this process is reduced by 27% to 7,250 $m^2$ per ton of carbon dioxide separated. The energy consumption is also reduced to 175 kW per ton of carbon dioxide separated.

The concentrated carbon dioxide stream, 206, is enriched in carbon dioxide to a concentration of 54 mol % carbon dioxide (63 mol % on a dry basis) while the vent gas contains about 5 mol % carbon dioxide.

Example 4

Combustion Process with Sweep-Based Membrane Separation According to FIG. 3

A calculation was performed to illustrate the treatment of exhaust gases from two boilers using two sweep-based membrane separation steps. The results of the calculation are shown in Table 4.

TABLE 4

| Gas Stream | First Exhaust (304) | $CO_2$ Concentrate (306) | Off-gas (307) | Second Exhaust (314) | First Residue (310) | Mixed Gas (315) | Vent Gas (318) | Permeate Stream (321) |
|---|---|---|---|---|---|---|---|---|
| Total flow ($m^3$/h) | 7,500 | 660 | 6,840 | 5,930 | 5,950 | 11,880 | 11,200 | 7,980 |
| Pressure (bara) | 1.1 | 0.2 | 1.1 | 1.1 | 1.1 | 1.1 | 1.0 | 0.9 |
| Temp (° C.) | 40 | 40 | 40 | 45 | 45 | 45 | 37 | 65 |
| Component (mol %) | | | | | | | | |
| $H_2O$ | 4.2 | 14.8 | 3.2 | 3.9 | 2.2 | 3.0 | 1.5 | 3.6 |
| $N_2$ | 71.2 | 20.4 | 76.0 | 82.7 | 84.9 | 83.8 | 87.8 | 66.9 |
| $O_2$ | 2.3 | 1.2 | 2.4 | 4.8 | 4.2 | 4.5 | 5.4 | 14.9 |
| $CO_2$ | 22.3 | 63.6 | 18.4 | 8.6 | 8.7 | 8.6 | 5.3 | 14.7 |

The calculated membrane area and net energy required for just one boiler were as follows:

Membrane area: 3,850 $m^2$ (about 4,780 $m^2$/ton of the carbon dioxide separated)

Energy usage: 206 kW/h per ton of carbon dioxide separated

The concentrated carbon dioxide stream, 306, is enriched in carbon dioxide to a concentration of about 64 mol % carbon dioxide (about 75 mol % on a dry basis) while the vent gas, 318, contains about 5 mol % carbon dioxide.

We claim:

1. A process for controlling carbon dioxide exhaust from multiple combustion processes, comprising:

(a) performing a first combustion process by combusting a first mixture of a fuel and air, oxygen-enriched air or oxygen, thereby creating a first exhaust stream comprising carbon dioxide and nitrogen;

(b) performing a carbon dioxide capture step to remove a portion of carbon dioxide in concentrated form from the first exhaust stream, thereby creating an off-gas stream from the capture step that is less concentrated in carbon dioxide than the first exhaust stream;

(c) performing a second combustion process by combusting a second mixture of a fuel and air, oxygen-enriched air or oxygen, thereby creating a second exhaust stream comprising carbon dioxide and nitrogen;

(d) mixing the second exhaust stream with at least a portion of the off-gas stream to produce a mixed gas stream;

(e) providing a membrane having a feed side and a permeate side, and being selectively permeable to carbon dioxide over nitrogen and to carbon dioxide over oxygen;

(f) passing at least a portion of the mixed gas stream across the feed side;

(g) passing air, oxygen-enriched air or oxygen as a sweep stream across the permeate side;

(h) withdrawing from the feed side a carbon-dioxide depleted vent stream;

(i) withdrawing from the permeate side a permeate stream comprising oxygen and carbon dioxide; and (j) passing the permeate stream to step (a) as at least part of the air, oxygen-enriched air or oxygen of step (a).

2. The process of claim 1, wherein the first exhaust stream comprises flue gas from a first combustion unit in the first combustion process and the second exhaust stream comprises flue gas from a second combustion unit in the second combustion process.

3. The process of claim 2, wherein the first and second combustion units are boilers.

4. The process of claim 1, wherein the carbon dioxide capture step comprises at least one process selected from the group consisting of absorption, adsorption, liquefaction and membrane separation.

5. The process of claim 1, wherein the sweep stream follows a sweep flow direction across the permeate side, the off-gas stream follows a feed flow direction across the feed side, and the sweep flow direction is substantially countercurrent to the feed flow direction.

6. The process of claim 1, wherein the membrane exhibits a carbon dioxide permeance of at least 500 gpu under process operating conditions.

7. The process of claim 1, wherein the membrane exhibits a selectivity in favor of carbon dioxide over nitrogen of at least 10 under process operating conditions.

8. The process of claim 1, wherein the vent stream contains less than about 6 vol % carbon dioxide.

9. The process of claim 1, wherein the off-gas stream is compressed to a pressure up to about 5 bar before being passed across the feed side.

10. The process of claim 1, wherein the carbon dioxide concentration of the off-gas stream from the carbon dioxide capture step and the carbon dioxide concentration of the second exhaust stream are substantially the same.

11. The process of claim 1, further comprising the step of mixing at least a portion of a third exhaust stream comprising carbon dioxide and nitrogen from a third combustion process with the first exhaust stream prior to step (b), the off-gas stream prior to step (d), the second exhaust stream prior to step (d), or the mixed gas stream prior to step (f).

12. A process for controlling carbon dioxide exhaust from multiple combustion processes, comprising:

(a) performing a first combustion process by combusting a first mixture of a fuel and air, oxygen-enriched air or oxygen, thereby creating a first exhaust stream comprising carbon dioxide and nitrogen;

(b) performing a carbon dioxide capture step to remove a portion of carbon dioxide in concentrated form from the first exhaust stream, thereby creating an off-gas stream from the capture step that is less concentrated in carbon dioxide than the first exhaust stream;

(c) providing a first membrane having a first feed side and a first permeate side, and being selectively permeable to carbon dioxide over nitrogen and to carbon dioxide over oxygen;

(d) passing the off-gas stream across the first feed side;

(e) withdrawing from the first feed side a first carbon-dioxide depleted stream;

(f) performing a second combustion process by combusting a second mixture of a fuel and air, oxygen-enriched air or oxygen, thereby creating a second exhaust stream comprising carbon dioxide and nitrogen;

(g) mixing at least a portion of the second exhaust stream with at least a portion of the first carbon dioxide-depleted stream to produce a mixed gas stream;

(h) providing a second membrane having a second feed side and a second permeate side, and being selectively permeable to carbon dioxide over nitrogen and to carbon dioxide over oxygen;

(i) passing at least a portion of the mixed gas stream across the second feed side;

(j) withdrawing from the second feed side a second carbon dioxide-depleted stream;

(k) passing at least a portion of air, oxygen-enriched air or oxygen as a first sweep stream across the second permeate side;

(l) withdrawing from the second permeate side a second-membrane permeate stream comprising oxygen and carbon dioxide;

(m) passing at least a portion of the second-membrane permeate stream comprising oxygen and carbon dioxide as a second sweep stream across the first permeate side of the first membrane;

(n) withdrawing from the first permeate side of the first membrane a first-membrane permeate stream comprising oxygen and carbon dioxide; and (o) passing the first-membrane permeate stream to step (a) as at least part of the air, oxygen-enriched air or oxygen of step (a).

13. The process of claim 12, wherein the first exhaust stream comprises flue gas from a first combustion unit and the second exhaust stream comprises flue gas from a second combustion unit.

14. The process of claim 12, wherein the first and second combustion units are boilers.

15. The process of claim 12, wherein the carbon dioxide capture step comprises at least one process selected from the group consisting of absorption, adsorption, liquefaction and membrane separation.

16. The process of claim 12, wherein the sweep stream follows a sweep flow direction across the permeate side, the off-gas stream follows a feed flow direction across the feed side, and the sweep flow direction is substantially countercurrent to the feed flow direction.

17. The process of claim 12, wherein the membrane exhibits a carbon dioxide permeance of at least 500 gpu under process operating conditions.

18. The process of claim 12, wherein the membrane exhibits a selectivity in favor of carbon dioxide over nitrogen of at least 10 under process operating conditions.

19. The process of claim 12, wherein the vent stream contains less than about 6 vol % carbon dioxide.

20. The process of claim 12, wherein the off-gas stream is compressed to a pressure up to about 5 bar before being passed across the feed side.

21. The process of claim 12, wherein the carbon dioxide concentration of the first carbon dioxide-depleted stream from the first membrane and the carbon dioxide concentration of the second exhaust stream are substantially the same.

22. The process of claim 12, further comprising the step of mixing at least a portion of a third exhaust stream comprising carbon dioxide and nitrogen from a third combustion process with the first exhaust stream prior to step (b), the off-gas stream prior to step (d), the first carbon dioxide-depleted stream prior to step (g), the second exhaust stream prior to step (g), or the mixed gas stream prior to step (i).

23. The process of claim 12, further comprising the step of mixing a gas stream comprising air, oxygen-enriched air, or oxygen with a portion of the second-membrane permeate stream prior to step (m) to form the second sweep stream.

24. The process of claim 23, wherein another portion of the second-membrane permeate stream is passed to step (a) as part of the air, oxygen-enriched air or oxygen of step (a) or is mixed with the first-membrane permeate stream prior to step (o).

25. The process of claim 23, wherein the gas stream comprises a portion of the first sweep stream.

26. A process for controlling carbon dioxide exhaust from multiple combustion processes, comprising:

(a) performing a first combustion process by combusting a first mixture of a fuel and air, oxygen-enriched air or oxygen, thereby creating a first exhaust stream comprising carbon dioxide and nitrogen;

(b) performing a carbon dioxide capture step to remove a portion of carbon dioxide in concentrated form from the first exhaust stream, thereby creating an off-gas stream from the capture step that is less concentrated in carbon dioxide than the first exhaust stream;

(c) providing a first membrane having a first feed side and a first permeate side, and being selectively permeable to carbon dioxide over nitrogen and to carbon dioxide over oxygen;

(d) passing the off-gas stream across the first feed side;

(e) withdrawing from the first feed side a first carbon-dioxide depleted stream;

(f) performing a second combustion process by combusting a second mixture of a fuel and air, oxygen-enriched air or oxygen, thereby creating a second exhaust stream comprising carbon dioxide and nitrogen;

(g) mixing at least a portion of the second exhaust stream with at least a portion of the first carbon dioxide-depleted stream to produce a mixed gas stream;

(h) providing a second membrane having a second feed side and a second permeate side, and being selectively permeable to carbon dioxide over nitrogen and to carbon dioxide over oxygen;

(i) passing at least a portion of the mixed gas stream across the second feed side;

(j) withdrawing from the second feed side a second carbon dioxide-depleted stream;

(k) passing at least a portion of air, oxygen-enriched air or oxygen as a first sweep stream across the second permeate side;

(l) withdrawing from the second permeate side a second-membrane permeate stream comprising oxygen and carbon dioxide;

(m) passing air, oxygen-enriched air or oxygen as a second sweep stream across the first permeate side of the first membrane;

(n) withdrawing from the first permeate side of the first membrane a first-membrane permeate stream comprising oxygen and carbon dioxide; and (o) passing the first-membrane permeate stream and the second-membrane permeate stream to step (a) as at least part of the air, oxygen-enriched air or oxygen of step (a).

27. The process of claim 26, wherein the first-membrane permeate stream and the second-membrane permeate stream are mixed together prior to step (o).

28. The process of claim 26, wherein the second sweep stream comprises a portion of the first sweep stream.

* * * * *